United States Patent Office 3,099,665
Patented July 30, 1963

3,099,665
TELOMERIZATION OF ETHYLENE WITH ALKYLENE GLYCOL DIFORMATES
Donald D. Emrick, Shaker Heights, and Samuel M. Darling, Lyndhurst, Ohio, assignors to The Standard Oil Company, Cleveland, Ohio, a corporation of Ohio
No Drawing. Filed Nov. 1, 1960, Ser. No. 66,418
5 Claims. (Cl. 260—410.6)

This invention relates to a process for the telomerization of ethylene with alkylene glycol diformates in the presence of a free radical initiator, and to the telomers obtained thereby.

Large amounts of ethylene are available from petroleum refinery gases or are made readily on cracking hydrocarbons. Hence, any new process for utilizing these olefins would be commercially attractive.

Olefins undergo a reaction known as telomerization, which has been described in numerous patents and publications. This involves the reaction of the olefin, called a taxogen, with a fragment of another molecule known as a telogen, and the product of this reaction is called a telomer. The reaction can be defined by the following equation:

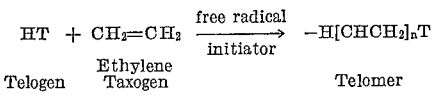

| Telogen | Ethylene Taxogen | Telomer |

Telomers are different from copolymers and interpolymers. Copolymers and interpolymers contain a number of each of two or more different monomer units in the main polymer chain, whereas the fragments of the telogen in telomers appear as units at the terminal of the main polymer chain. Telomerization differs from simple free radical addition to the double bond of an olefin in that more than one molecule of the olefin appears in the product. The telomerization reaction proceeds in the presence of a free radical initiator which removes an active hydrogen from the telogen. The resulting radical initiates the telomerization by adding to the double bond of the olefin.

In the process of the invention, ethylene as the taxogen is telomerized with an alkylene glycol diformate telogen in the presence of a free radical initiator for the telomerization. The reaction proceeds with ease at the site of the active hydrogens on the formate ester groups. It is usually desirable that the alkylene glycol group be free from active hydrogens, i.e., tertiary hydrogens attached to carbon atoms adjacent the formate ester group, so as to confine the telomerization to the formate ester groups.

The product is a telomer containing an alkylene glycol diformate ester group as a nucleus, having polyethylene groups attached to the carbonyl carbon of each formate ester group.

The telogen can be defined by the following general formula:

Each R is an alkylene radical containing from two to about six carbon atoms, and the telogen has a total of at least six to about sixty-six carbon atoms. The alkylene group can be straight or branched, but any branching is preferably confined to carbon atoms other than those in the position alpha to the formate ester groups. The R radicals can be the same or different in any given alkylene glycol diformate.

$n$ represents the number of oxyalkylene units in the formate ester, and ranges from 0 to about 10, preferably from 0 to about 2. $n$ is taken in sufficient number to give a total of six carbons in the telogen. Thus, if R has two carbons, $n$ is at least three, and if R has three carbons, $n$ is at least two.

Typical R radicals are ethylene, 1,3-propylene, 1,2-propylene, 1,4-butylene, 2-methyl-1,3-propylene, 1,5-pentylene, 1,6-hexylene, 2-ethyl-1,4-butylene, 2,2,-dimethyl-1,4-butylene, 2,2-dimethyl-1,3-propylene, 3-methyl pentylene, 1,1-dimethyl-1,3-propylene, 2,3-dimethyl-1,4-butylene, 2-isopropyl-1,3-pyropylene, and 2-methyl-2-ethyl-1,3-propylene. These can be present as the only R radical ($n=0$), and in combinations as polyoxyalkylene units OR(OR)$_n$O, such as those derived from diethylene glycol, di-1,3-propylene glycol, triethylene glycol, tetraethylene glycol, tetra-1,4-butylene glycol, decaethylene glycol, penta-1,3-propylene glycol, polyoxy-1,4-butylene glycol having ten oxybutylene units, polyoxy-1,3-propylene glycol having eight oxypropylene units, mixed polyoxy-1,3-propyleneethylene glycol having ten of the mixed units, and tetrahexylene glycol. All of these are prepared by reaction of 2 moles of formic acid with each mole of the corresponding glycol or glycol polyether.

The alkylene glycol diformates are believed to react with ethylene according to the following equation:

In the above formulae, R and $n$ are as defined above. $x_1$ and $x_2$ range from about 5 to about 30, and represent the number of ethylene units attached to the formate ester groups.

In a small proportion of the molecules as described above there may be polyethylene groups attached to one or both of the carbon atoms of the alkylene group that are in a position alpha to the formate ester groups, for example:

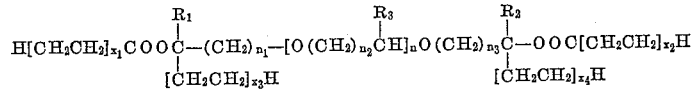

$n_1$, $n_2$ and $n_3$ represent the number of CH$_2$ units in the alkylene group. $x_3$ and $x_4$ represent the number of ethylene units attached to the alpha carbons, and are less than $x_1$ and $x_2$. R$_1$ and R$_2$ are alkyl groups of one to six carbon atoms. Unless these carbons bear active tertiary hydrogens, however, as shown, due to branching, the proportion of such materials in the telomeric product is negligible.

The reaction mechanism has been tentatively confirmed by infrared analysis of the telomer product. Since the alkylene glycol formate contains two reactive hydrogen sites, one at each formate ester group, the telomerization may proceed at both sites, although one site will usually be attacked first. The number of ethylene units $x_1$ and $x_2$ in the telomer will depend on the reaction conditions, and the amount of ethylene and free radical initiator available for the telomerization.

Ethylene is the taxogen of choice, inasmuch as it reacts smoothly and rapidly to give telomers of the desired molecular weight, as indicated above. The use of higher molecular weight olefins may result in the formation of large amounts of polymeric materials, but in some cases it is possible to employ mixtures of ethylene with up to 25% of a higher molecular weight olefin, such as propylene, to advantage.

The high molecular weight telomeric products are solid materials which tend to be wax-like in properties and are useful as components of protective coatings or as films or protective coatings per se, as well as polishing compositions and as textile lubricants. The lower molecular weight telomeric material tend to have a lower melting point, and may be liquids at atmospheric temperatures, useful as synthetic lubricants or hydraulic fluids, per se or as components of such compositions. In most cases, the product comprises a complex mixture of high and low molecular weight materials, but these are readily separated.

The reaction requires a free radical initiator, and this substance can be any of those well known to those skilled in this art as useful in the telomerization of ethylene. It should be sufficiently active to decompose freely into free radicals under the reaction conditions which can be employed. Initiators which lead to excessive cleavage of polyoxyalkylene glycol diformates under the reaction conditions should, however, be avoided.

An initiator is required which is capable of depriving the telogen of its active hydrogen at the formate ester groups and starting the series of reactions which leads to the telomer. The energy required to remove this hydrogen is apparently higher than that needed in adding a free radical across the carbon-to-carbon double bond of the olefin. Free radicals are required which are active at the temperatures permissible in the telomerization reaction. Furthermore, the telomerization reaction chain is easily interrupted and the reaction halted by conventional free radical inhibitors, and the reactants should be relatively free from such inhibitors.

Initiators which can be used include diacyl peroxides such as diacetyl peroxide, dipropionyl peroxide, dibutyryl peroxide, and dilauroyl peroxide, dialkyl peroxides such as di-tert-butyl peroxide, dihexyl peroxide, diisopropyl peroxide, di-isobutyl peroxide, di-2-ethylhexyl peroxide, di-n-butyl peroxide, and diethyl peroxide; terpene peroxides, dicycloaliphatic peroxides such as dicyclohexyl peroxide; perhalogen compounds such as hexachloroethane and combinations thereof with dialkyl peroxides, organometallic compounds such as tetraethyl lead and tetraphenyl lead, and azo N=N compounds such as azobis(isobutyronitrile) and diazoaminobenzene.

Di-tert-butyl peroxide is a preferred free radical initiator for use in this invention, because it shows a minimum tendency towards ether cleavage under most reaction conditions.

The stability of free radical initiators is customarily evaluated in terms of half-life at a stated temperature, and the following table compares this for several commercially available free radical initiators useful in the invention:

TABLE I

| Compound | Temp. (° C.) | Half Life (Hours) | No. Moles of Radical Produced Per Pound |
|---|---|---|---|
| 1. Tetraethyl Lead | | | 5.62 |
| 2. Lauroyl Peroxide | 50 | 54.2 | 2.27 |
| | 70 | 3.4 | |
| | 85 | 0.5 | |
| 3. Dicumyl Peroxide | 115 | 12.4 | 3.34 |
| | 130 | 1.8 | |
| | 145 | 0.38 | |
| 4. Di-t-butyl Peroxide | 100 | 218 | 6.20 |
| | 115 | 34 | |
| | 130 | 6.4 | |
| | 145 | 1.4 | |
| | 160 | 0.24 | |
| 5. 2,4-Dichlorobenzoyl Peroxide | 50 | 17.8 | 2.38 |
| | 70 | 1.41 | |
| | 85 | 0.25 | |
| 6. Azobis(isobutyronitrile) | 80 | 1.26 | 5.50 |

In general, the half-life of the free radical initiator employed at the reaction temperature should be within the range from about 0.25 to about 10 hours, since such initiators have been found to give the best results. By suitable modification of the reaction conditions, however, it is possible to employ free radical initiators whose half-life is outside of this range.

The reaction conditions can be widely varied. The conditions should be such that excessive ether cleavage does not occur. The preferred reaction temperature is established by the temperature at which the free radical initiator decomposes to give a rapid liberation of a substantial amount of free radicals within the above-stated range for half-life. For di-tertiary-butyl peroxide, for example, the table shows that the preferred reaction temperatures are within the range from 60 to 160° C. At reaction temperatures below this, because of the slower evolution of free radicals, the reaction time tends to be quite long. Higher temperatures may be wasteful, since the free radical initiator may be decomposed at a higher rate than can be utilized in the telomerization, so that the free radicals will be lost and therefore wasted. In general, for heat-decomposable free radical initiators, reaction temperatures within the range from 50 to 200° C. are useful.

The reaction is carried out under pressure. The number of ethylene groups incorporated into the telomer is in part dependent upon the ethylene pressure which of course reflects the concentration of ethylene present. The higher the ethylene concentration (or pressure), the longer the telomer chain, i.e., the greater the values of $x_1$ and $x_2$ (and also $x_3$ and $x_4$) in the formulae set forth above. In general, pressures within the range from about 500 to about 10,000 p.s.i. can be employed. Products having optimum properties are usually obtained at pressures within the range from about 1,000 to about 5,000 p.s.i., and such pressures are accordingly preferred.

No solvent for the diformate ester is necessary unless dilution is desired to maintain control of the reaction rate. However, a solvent for the ethylene will assist in bringing it into contact with the diformate ester, and it may be possible because of this facilitation of the reaction to use less ethylene in the reaction mixture. A solvent also may be desirable when the diformate ester is a solid, in order to increase the reaction rate.

The solvent should be inert under the telomerization reaction conditions. Suitable solvents include benzene, cyclohexane, n-octane and isooctane. Preferably, the reaction mixture is agitated throughout the reaction.

The reaction initially is exothermic, and although heating may be required to start the reaction, thereafter it requires careful control to prevent the temperature from rising so high that free radial initiator decomposition becomes too rapid. As the reaction proceeds, less heat is liberated, and eventually it becomes necessary to heat the reaction mixture in order to bring the reaction to completion.

The reaction time will depend upon the initiator and the reactants, the concentrations thereof, and the reaction temperature. It is usually convenient to employ reaction conditions such that the reaction can be complete in less than ten hours, but of course, this is a matter of choice, and reaction times as long as thirteen to fifty hours may not be out of line, depending upon the need.

A high olefin concentration will yield a higher molecular weight product than will a lower olefin concentration. A lower temperature has the same effect. At any given pressure level, the average molecular weight of the product may be increased by operating at the minimum temperature permitted by the decomposition temperature of the free radical initiator, so as to obtain a slow evolution of free radicals, but such reactions will require a long time to complete. The same effect may be obtainable by incorporating an inert diluent which is a good solvent for ethylene.

The reaction is easily carried out in conventional pressure equipment. The reactants are introduced in any convenient order, and the equipment brought to the reaction conditions desired. Preferably the alkylene glycol formate, ethylene and solvent, if one is employed, are first mixed together and the free radical initiator is then added incrementally. The reaction vessel can be run at a constant ethylene pressure throughout the reaction during the addition. In this manner, greater telogen conversions can be obtained, together with the production of telomers of a more uniform average molecular weight distribution.

The course of the reaction is followed from the drop in ethylene pressure. If an initial pressure of 850 p.s.i.g. at 20° C. of ethylene is used, the pressure during a successful telomerization will frequently by decreased by from 25 to 50% of its initial value during the course of the reaction. The final telomer is stripped of volatiles by treating the warm telomer with a stream of air at 90–100° C. Alternatively, the product may be stripped of volatiles under a vacuum. The stripped product is then cooled to 0 to 20° C. If a liquid product free from wax is desired, the product can be treated with fuller's earth, or preferably bentonite clay, in order to remove the small quantity of wax usually present. It can also be fractionally distilled, preferably under reduced pressure.

A continuous reaction is of particular interest in a commercial process. This is readily effected by suitable equipment which permits continuous blending of the alkylene glycol diformate with the ethylene and free radical initiator, holding them in a pressurized reaction chamber in which they have a dwell time equivalent to that required to complete the reaction, and then drawing them off to a working-up chamber where the volatiles are removed and the residue recovered.

Telomer products are obtainable having a wide range of molecular weights, which vary according to the reactants, reaction conditions and concentration of reactants. The molecular weight, depending upon the alkylene glycol diformate, can range from as low as 100 up to about 5000. The low molecular weight materials are oils or low-melting waxes and the high molecular weight materials are soft to hard waxy solids.

The following examples in the opinion of the inventors represent the best embodiments of their invention:

*Example 1*

Into a 250 ml. capacity Magne-Dash autoclave were placed 55 g. of di-1,3-propylene glycol diformate and 0.78 g. of di-tert-butyl peroxide. The contents of the autoclave were purged of air, using nitrogen, and then charged with U.S.P. ethylene. The reaction vessel was then heated (890 p.s.i. of pressure at 243° F.) to 280° F. and maintained at 280–293° F. for a total of eighteen hours. The final pressure was 625 p.s.i. at 292° F. The crude product was an oil having insoluble wax suspended in it, and having a saponification number of 439. Fractional distillation of the 55.6 g. of crude telomeric product yielded starting telogen, a fraction having a boiling range of 93 to 135° C. at 0.7 mm. (saponification No. 369); a fraction having a boiling range of from 135° C./0.7 mm. to 170° C./1 mm. (saponification No. 226); and pot residue, a wax having a boiling point above 170° C./1 mm., saponification No. 92.

*Example 2*

Into a 250 ml. capacity Magne-Dash autoclave were placed 55 g. of di-1,3-propylene glycol diformate and 0.78 g. of di-tert-butyl peroxide. These ingredients were reacted under the same conditions as Example 1. 59.6 g. of crude telomeric product were obtained, an oil having insoluble wax suspended in it. The residual oil obtained after fractionation of the wax had a saponification No. of 259.

*Example 3*

Into a 250 ml. capacity Magne-Dash autoclave were placed 55 g. of di-1,2-propylene glycol diformate and 0.78 g. of di-tert-butyl peroxide. These ingredients were reacted under the same conditions as Example 1. The crude telomeric product obtained was an oil having insoluble wax suspended in it. The wax was fractionated to recover the residual oil.

*Example 4*

Into a 250 ml. capacity Magne-Dash autoclave was placed 77 g. of diethylene glycol diformate and 2.34 g. of di-tert-butyl peroxide. The contents of the autoclave were purged of air, using nitrogen, and then charged with U.S.P. ethylene. The reaction vessel was heated (950 p.s.i. of pressure at 240° F.) at 280 to 314° F. for a total of nineteen hours. The final pressure was 800 p.s.i. at 312°F. 95.7 g. of crude telomeric reaction product were obtained, which upon fractionation yielded starting telogen, a telomer having a boiling range of from 105 to 136° C./0.65 mm.; a telomer having a boiling range of 136° C./0.65 mm. to 170° C./0.8 mm., saponification No. 320.

*Example 5*

Into a 250 ml. capacity Magne-Dash autoclave was placed 77 g. of diethylene glycol diformate and 2.34 g. of di-tert-butyl peroxide. The contents of the autoclave were purged of air, using nitrogen, and then charged with U.S.P. ethylene. The reaction vessel was then heated (1220 p.s.i. at 260° F.) at 268 to 286° F. for a total of five hours. The final pressure was 600 p.s.i. at 272° F. 100.5 g. of crude telomeric product were obtained, which upon fractionation yielded starting telogen, a telomer whose boiling range was from 78° C./0.6 mm. to 134° C./0.8 mm.; a telomer of boiling range 134 to 164° C./0.8 mm. and a waxy residue having a boiling point above 164° C./0.8 mm., saponification No. 151, molecular weight 1343.

*Example 6*

Into a 250 ml. capacity Magne-Dash autoclave was placed 77 g. of diethylene glycol diformate and 2.34 g. of di-tert-butyl peroxide. The contents of the autoclave were purged of air, using nitrogen, and then charged with U.S.P. ethylene and reacted under the conditions set forth in Example 4. Fractionation of the 91.6 g. of crude telomeric product obtained yielded starting telogen, a telomer having a boiling range of from 84° C./0.65 mm. to 171° C./1.5 mm. and a waxy residue boiling above 171° C./1.5 mm., saponification No. 207.

*Example 7*

Into a 250 ml. capacity Magne-Dash autoclave was placed 77 g. of diethylene glycol diformate and 2.34 g. of di-tert-butyl peroxide. The contents of the autoclave were purged of air, using nitrogen, and then charged with U.S.P. ethylene. The reaction vessel was then heated (2800 p.s.i. of pressure at 265° F.) at 265 to 306° F. for a total of fifteen hours. The final pressure was 1010 p.s.i. at 292° F. Fractionation of the 92.7 g. of crude telomeric product obtained yielded starting telogen; a telomer, having a boiling range of 83–134° C./0.6 mm.; a telomer, having a boiling range of 134° C./0.6 mm. to 173° C./0.75 mm., and a waxy residue, boiling point above 173° C./0.75 mm., saponification No. 147, molecular weight 1317.

*Example 8*

Into a 500 ml. capacity Magne-Dash autoclave was placed 158 g. of triethylene glycol diformate and 6.08 g. of di-tert-butyl peroxide. The contents of the autoclave were purged of air, using nitrogen, and then charged with U.S.P. ethylene. The reaction vessel was slowly heated (1350 p.s.i. of pressure at 233° F.) and maintained at 285–300° F. for three and one-half hours. The final pressure was 880 p.s.i. at 304° F. Fractionation of the 107.2 g. of crude telomeric product obtained yielded starting telogen; a telomer boiling in the range from 85° C./0.4 mm. to 120° C./0.45 mm.; a telomer having a boiling range of 120° C./0.45 mm. to 202° C./1.5 mm.; a telomer having a boiling range of 202° C./1.5 mm. to 210° C./5 mm. and a waxy residue having a boiling point above 210° C./5 mm., saponification No. 74, molecular weight 878.

The telomers of the invention, as the general formula shows, possess a hydrocarbon portion, composed of polyethylene groups, and a central alkylene glycol ester nucleus. As a result, being both hydrocarbons and esters, and in some cases also ethers, they have most attractive properties, both chemical and physical.

The polyethylene portion of the telomer, according to its molecular weight, controls the melting properties of the telomer, which varies from a liquid to a wax. The alkylene glycol diformate nucleus modifies the polyethylene telomer considerably, so that compared to polyethylene of like molecular weight, much higher elasticity and flexibility are evident. These modifications are responsible for improved and in many cases unique properties.

The waxy telomers are useful as waxes in the formulation of polishes, candles, carbon paper, cleaners, matches and printing inks. They have been blended with polyethylene and/or paraffin wax, and the blends can be used in coating compositions for paper and paper containers, for example, milk cartons.

For example, ordinary crystalline paraffin wax (90 g.) with a solidification point of 250° C. and hardness corresponding to a penetration of 2.8 ml. was blended with 10 g. of the waxy telomer residue of Example 8. The wax blend has been found very suitable in viscosity, flexibility and toughness for coating paper by, for example, the hot dip method.

The liquid telomers, when compared to mineral lubricating oils, have a higher temperature stability, a higher viscosity index, a higher density, and a lower pour point for a given viscosity. They also have a high solvent power for resins and gums, as well as for sludges and varnishes. Unlike the common synthetic polyoxyethylene glycol oils, they can have quite good solubility in petroleum hydrocarbons because of the polyethylene portions of the telomer.

The telomeric oils of the invention are useful, alone or in combination with petroleum-derived fluids such as mineral lubricating oils, as lubricants for internal combustion engines, high temperature lubricants in glass and ceramic manufacture, kiln lubricants, lubricants for car bearings, heat transfer fluids, hydraulic fluids, textile lubricants and other applications where low carbon residue, high lubricity and petroleum oil solubility make them quite attractive. They may be useful as radiator coolants, and in the prevention or alleviation of the effects of carburetor icing and associated phenomena, when used as additives in petroleum base fuels such as gasoline. They are useful as plasticizers for synthetic resins with which they are compatible.

Hydrolysis of both the formate ester groups removes the alkylene glycol nucleus, producing two polyethylene fragments having terminal free acid groups. Hydrolysis of one formate ester group produces one such polyethylene acid fragment and one mono hydroxy ester. Thus, unusual long chain acids and hydroxy esters can be obtained by this telomerization reaction. Because of the greater reactivity of the formate esters in telomerization, this may be a better route to these compounds than direct telomerization of the acids and hydroxy esters.

We claim:
1. A process for producing ethylene telomers having an alkylene glycol diformate ester unit in the molecule, which comprises telomerizing ethylene with an alkylene glycol diformate having from about six to about sixty-six carbon atoms in the presence of a free radical initiator capable of initiating the telomerization at a temperature at which an evolution of free radicals from the initiator is obtained.
2. A process in accordance with claim 1 in which the temperature is within the range from about 50 to about 200° C.
3. A process in accordance with claim 1 in which the pressure is within the range from about 500 to about 10,000 p.s.i.
4. A process in accordance with claim 1 in which the free radical initiator is a dialkyl peroxide.
5. A process in accordance with claim 1 in which the telogen is a polyoxyalkylene glycol diformate.

References Cited in the file of this patent
UNITED STATES PATENTS

| | | |
|---|---|---|
| 2,402,137 | Hanford et al. | June 18, 1946 |
| 2,585,448 | Emerson et al. | Feb. 12, 1952 |
| 2,599,803 | Ballard et al. | June 10, 1952 |
| 2,800,500 | Matuszak et al. | July 23, 1957 |
| 2,820,014 | Hartley et al. | Jan. 14, 1958 |
| 2,950,299 | Kirkpatrick | Aug. 23, 1960 |